US012584895B2

(12) United States Patent
Oberle et al.

(10) Patent No.: US 12,584,895 B2
(45) Date of Patent: Mar. 24, 2026

(54) METHOD FOR EVALUATION OF A THIN-LAYER CHROMATOGRAPHY PLATE

(71) Applicant: MERCK PATENT GMBH, Darmstadt (DE)

(72) Inventors: Michaela Oberle, Darmstadt (DE); Eric Schunda, Kronberg Im Taunus (DE); Robert Fischer, Kronberg Im Taunus (DE)

(73) Assignee: MERCK PATENT GMBH, Darmstadt (DE)

( * ) Notice: Subject to any disclaimer, the term of this patent is extended or adjusted under 35 U.S.C. 154(b) by 299 days.

(21) Appl. No.: 18/036,997

(22) PCT Filed: Nov. 12, 2021

(86) PCT No.: PCT/EP2021/081453
§ 371 (c)(1),
(2) Date: May 15, 2023

(87) PCT Pub. No.: WO2022/101373
PCT Pub. Date: May 19, 2022

(65) Prior Publication Data
US 2024/0019409 A1     Jan. 18, 2024

(30) Foreign Application Priority Data

Nov. 16, 2020     (EP) ..................................... 20207936

(51) Int. Cl.
*G01N 30/95*          (2006.01)
*B01D 15/08*          (2006.01)
(Continued)

(52) U.S. Cl.
CPC ............. *G01N 30/95* (2013.01); *B01D 15/08* (2013.01); *G06T 5/70* (2024.01); *G06T 7/001* (2013.01);
(Continued)

(58) Field of Classification Search
CPC .. G01N 30/95; G06T 7/70; G06T 5/70; G06T 7/001; G06T 2207/10152; G06T 2207/30108; B01D 15/08
See application file for complete search history.

(56) References Cited

U.S. PATENT DOCUMENTS

| | | |
|---|---|---|
| 3,924,948 A | 12/1975 | Thoden et al. |
| 10,578,595 B2 | 3/2020 | Schulz et al. |
| 2017/0336371 A1 | 11/2017 | Schulz et al. |

FOREIGN PATENT DOCUMENTS

JP          2013224901 A   *  10/2013

OTHER PUBLICATIONS

Hiroko Shimizu-Yumoto et al.: "Slantingly cross loading sample system enables simultaneous performance of separation and mixture to detect molecular interactions on thin-layer chromatography", Journal of Chromatography A, Elsevier, Amsterdam, NL, vol. 1245, May 1, 2012 (May 1, 2012), pp. 183-189, XP028521227, ISSN: 0021-9673, [retrieved on May 9, 2015], DOI: 10.1016/J.CHROMA.2012.05.011.

(Continued)

*Primary Examiner* — Stephen D Meier
*Assistant Examiner* — Quang X Nguyen
(74) *Attorney, Agent, or Firm* — Millen, White, Zelano & Branigan, P.C.; Brion P. Heaney

(57) ABSTRACT

A method for evaluation of a thin-layer chromatography plate after performing a separation process that separates components of a sample on the thin-layer chromatography plate comprises a digitization step, wherein at least two digital images are taken that differ with respect to the wavelength range of illumination of the thin-layer chromatography plate. The method further comprises a position identification step wherein the position of the thin-layer chromatography plate is identified for each of the at least two digital images. Furthermore, the method comprises an (Continued)

evaluation step wherein an image information of the at least two digital images is superimposed for at least all regions with at least one visible spot within at least one of the at least two digital images, so that the superimposition of image information from identical regions of at least two digital images can be used for evaluation of the thin-layer chromatography.

19 Claims, 4 Drawing Sheets

(51) Int. Cl.

| | |
|---|---|
| *G06T 5/00* | (2024.01) |
| *G06T 5/70* | (2024.01) |
| *G06T 7/00* | (2017.01) |
| *G06T 7/70* | (2017.01) |

(52) U.S. Cl.
CPC ...... *G06T 7/70* (2017.01); *G06T 2207/10152* (2013.01); *G06T 2207/30108* (2013.01)

(56) References Cited

OTHER PUBLICATIONS

Burns D H et al.: "Multidimensional detection and analysis in thin-layer chromatography", Trac Trends in Analytical Chemistry, Elsevier, Amsterdam, NL, vol. 5, No. 2, Feb. 1, 1986 (Feb. 1, 1986), pp. 50-52, XP026578709, ISSN: 0165-9936, [retrieved on Feb. 1, 1986], DOI: 10.1016/0165-9936(86)85010-5.

Aldridge P K et al.: "A Field Portable Scanner for Analysis of Thin Layer Chromatography Plates Based On Multiwavelength Image Processing", Review of Scientific Instruments, American Institute of Physics, 2 Huntington Quadrangle, Melville, NY 11747, vol. 63, No. 10 PT. 01, Oct. 1, 1992 (Oct. 1, 1992), pp. 4333-4341, XP000316291, ISSN: 0034-6748, DOI: 10.1063/1.1143733.

International Search report PCT/EP2021/081453 dated Feb. 8, 2022 (pp. 1-4).

* cited by examiner

METHOD FOR EVALUATION OF A THIN-LAYER CHROMATOGRAPHY PLATE

TECHNICAL FIELD

The present invention relates to a method for evaluation of a thin-layer chromatography plate after performing a separation process that separates components of a sample on the thin-layer chromatography plate, whereby within a digitization step a digital image of the thin-layer chromatography plate is taken with a digital imaging device, whereby within a position identification step the position of the thin-layer chromatography plate within the digital image is identified, and whereby within an evaluation step the position of visible spots indicating sample components on the thin-layer chromatography plate is determined in order to evaluate the thin-layer chromatography on the basis of the determined positions of spots.

BACKGROUND

Thin-layer chromatography is a chromatography technique used to separate non-volatile mixtures within a sample, which allows for identifying and possibly quantifying the individual components of the sample. Thin-layer chromatography is usually performed on a thin-layer chromatography plate that can be a plate of glass or plastic or an aluminum foil, which is coated with a thin-layer of adsorbent material, like e.g. a silica gel, aluminum oxide or cellulose. This layer of adsorbent is known as the stationary phase.

After the sample has been applied onto the plate, a solvent or solvent mixture that is known as the mobile phase is drawn up the plate via capillary action. If the sample is applied onto a region close to a border of the plate and the solvent mixture is drawn up from the same border of the plate, the sample is drawn up together with the solvent mixture across the plate. Because different components of the sample, i.e. different analytes ascend the plate at different rates, a separation of the analytes is achieved resulting in different spots along the path of the solvent mixture that is drawn up and travels across the plate.

After such a development of the thin-layer chromatography plates, the spots of the different analytes within a sample are visualized. This can be done by illuminating the plate with visual light or with ultraviolet light. It is also possible to perform chemical processes to improve the visibility of spots. The position and the size of these spots on the plate can be used for identification of the analytes as well as for quantitative measurements of the amount of the respective analytes within the sample.

To identify components, the distance traveled by the analyte being considered is divided by the total distance traveled by the mobile phase, i.e. the solvent mixture. This ratio is called the retardation factor. Retardation factors are characteristic, but will change depending on the exact condition of the mobile and stationary phase. For this reason, usually a sample of a known compound is combined with one or more samples of interest to the plate before developing the plate and analyzing the results.

Thin-layer chromatography can be used to monitor the progress of a reaction, identify compounds present in a given mixture, and determine the purity of a substance. Thus, thin-layer chromatography is a well-established means for analyzing samples in many different application environments like e.g. research and development as well as monitoring and quality control of industrial manufacturing processes.

There are some thin-layer chromatography plate evaluation devices available that allow for performing semi-automatic or fully automated steps for evaluation of thin-layer chromatography plates that have been developed by a separation process. Some devices provide for a digitization chamber with a tray or a slot to receive the thin-layer chromatography plate. Afterwards, the plate will be illuminated with a light source, and a digital image is taken with a digital imaging device like e.g. a digital camera or even a smart phone. At least some of the already available devices provide for a software that allows for the visualization and identification of visible spots within such a digital image that has been taken from a thin-layer chromatography plate. Sometimes, evaluation of the digital images of thin-layer chromatography plates is performed by using some stand-alone software that runs on a computer.

However, these known methods for evaluation of digital images have some disadvantages and limitations. Usually, the software that is used for evaluation of developed thin-layer chromatography plates is adapted for evaluation of a given size of the plates and also requires a well-defined position and orientation of the plates during the digitization step. Only then the pixels of the digital image can be referenced to corresponding positions on the thin-layer chromatography plate. The use of such a software is usually limited to one shape of thin-layer chromatography plates. The results of the evaluation depend heavily on the manually specified arrangement and orientation of the plates during the recording of the digital images.

Furthermore, it is well-known that the identification and evaluation of visible spots on a thin-layer chromatography plate is limited by the quality of the digital image that is taken from the thin-layer chromatography plate. In addition, the visibility of spots of the samples that have been separated over the surface of the thin-layer chromatography plate also depends on the illumination of the plates during the digitization step, i.e. on the wavelength or the light emission characteristics of the illumination device that is used for illumination of the plates.

Accordingly, there is a need for a method that allows for obtaining more information and preferably more precise information from digital images that have been taken from thin-layer chromatography plates after the development of the thin-layer chromatography plates.

SUMMARY OF THE INVENTION

The present invention relates to a method for the evaluation of thin-layer chromatography plates with a digitization step, with a position identification step and with an evaluation step as described above, whereby within the digitization step at least two digital images that differ with respect to the wavelength range of illumination are taken, in that within the position identification step the position of the thin-layer chromatography plate is identified for each of the at least two digital images, and in that within the evaluation step an image information of the at least two digital images is superimposed for at least all regions with at least one visible spot within at least one of the at least two digital images, so that the superimposition of image information from identical regions of at least two digital images can be used for evaluation of the thin-layer chromatography. The invention makes use of the knowledge that different illumination of the same plate results in different visibility of spots of sample material that has been separated over the surface of the thin-layer chromatography plate. Thus, a spot within a region of the plate that is clearly visible with a first illumination can be less visible or even difficult to identify with a second illumination. However, by evaluating several digital images of the same plate that have been taken with different illumination, it is possible to identify more spots and to obtain more precise results by analyzing more spots compared to the results that can be obtained from a single digital image.

It is advantageous to capture two or more different digital images of the thin-layer chromatography plate with different illumination without moving the thin-layer chromatography plate and the optical imaging device with respect to each other. Thus, the same pixels of the digital image correspond to the same point on the surface of the thin-layer chromatography plate and therefore for each of the digital images the same pixel can be referenced with the same real-world coordinate that corresponds to said pixel without the need for optical image recognition and optical image analysis methods to identify the shape and position of the thin-layer chromatography plate within each digital image. Referencing the pixels of a digital image with real-world coordinates that refer to a position on the surface of the thin-layer chromatography plate allows for identifying the real position of spots of developed sample material on the thin-layer chromatography plate. Such information can be used for subsequent optical marking of spots within a visual reproduction of the thin-layer chromatography plate for visual inspection of a user, or for subsequent analysis of sample material that is retrieved from a selected spot at a given position on the surface of the thin-layer chromatography plate. Furthermore, by referencing the pixels of digital images with real-world coordinates it becomes possible to identify the location of spots within a digital image that are invisible or almost invisible within this digital image, but that are visible within another digital image that has been taken with a different illumination.

A single digital image may comprise more than one thin-layer chromatography plates that are arranged next to each other. It is possible to arrange e.g. two or three thin-layer chromatography plates in a row, or e.g. two, four or six thin-layer chromatography plates in a matrix like arrangement, and to take one single digital image of all these thin-layer chromatography plates. It is even possible to arrange an arbitrary number of thin-layer chromatography plates in an arbitrary arrangement and with different orientation and distance towards each other, and to take one single digital image of all these thin-layer chromatography plates. Afterwards, the single digital image can be automatically analyzed and all thin-layer chromatography plates that are comprised within the single digital image can be identified by making use of known image processing software modules that identify the borders and the areas bordered by them of each thin-layer chromatography plate. Afterwards, for each thin-layer chromatography plate the above described evaluation method can be performed individually, i.e. without referring to information that is based on or related to another thin-layer chromatography plate.

In order to allow for a fully automated evaluation process, two digital images are taken from the same plate, but with different illumination, and within the subsequent position identification step, the two digital images are analyzed with image analyzing methods in order to identify the shape, the position and the orientation of the plate within the digital images. With well-known methods and already available software modules it is possible to automatically identify the shape, position and orientation of a plate within a digital image. Thus, after completion of the position identification step, each pixel of each of the digital images can be referenced to a position on or next to the surface of the thin-layer chromatography plate in question. Performing such a fully automated position identification step provides precise position information with respect to the thin-layer chromatography plate related to each of the digital images without need for manual input or manual image analysis. Furthermore, it is also possible to overlay the two digital images in a manner as to overlay the correlating positions and regions of the thin-layer chromatography plate. The superimposition of the digital images results in enhanced image information for each position of the surface of the thin-layer chromatography plate. If such a superimposition of image information is performed for all regions comprising a spot in at least one of the digital images, the superimposition adds the information related to a spot from two digital images. Even though the spot may be visible to the human eye solely within one of the digital images, there might be a small contribution of information from the other digital image that is not visible to the human eye, but nevertheless enhances the superimposed image information and allows for a more precise analysis of the spots on the surface of the thin-layer chromatography plate. Due to the superimposition of several digital images with correlating position information of each respective pixel coordinates and by referencing to identical real-world coordinates of the thin-layer chromatography plate, it is possible to identify spot regions on thin-layer chromatography plates and corresponding images that are not visible to the human eye, but can be taken into account for the evaluation of the thin-layer chromatography plate.

According to an embodiment of the invention, at least one digital image is taken with illumination of the thin-layer chromatography plate with visible light and at least one digital image is taken with illumination of the thin-layer chromatography plate with UV light. The visible light can be monochrome light with a wavelength within the wavelength region between approx. 400 nm to 750 nm or 380 nm to 800 nm. The visible light can also be light from an illumination device with broad emission characteristics, e.g. white light comprising wavelengths between 400 nm up to 800 nm. The UV light comprises wavelengths below 400 nm, preferably wavelengths below 300 nm. The UV light can be emitted from a gas discharging bulb. However, with respect to size and energy consumption, the illumination devices used for the different illuminations may comprise light emitting diodes with suitable light emission characteristics.

For many samples, it is advantageous to make use of two digital images with significant illumination differences, i.e. to make use of one digital image taken with illumination with visible light and the other digital image taken with illumination with UV light. Then, many spots that are less pronounced or even not visible within one of the digital images, are clearly visible and easy to identify within the other digital image. Furthermore, for many solvents in combination with many thin-layer chromatography plates the position of a solvent front of the mobile phase after developing the thin-layer chromatography plate is better visible with illumination with UV light with a wavelength of e.g. 254 nm compared to illumination with visible light. By superimposing the digital image information of both digital images, also the information from the digital image with only a small contribution is taken into account for further evaluation and analysis of the sample information.

In yet another favorable embodiment of the invention, at least three different digital images with illumination with different light are taken and used for evaluation. The three different illuminations can comprise illumination e.g. with white light, with UV light with a wavelength of 366 nm and with UV light with a wavelength of 255 nm. It has been found that for many samples the digital image information significantly differs depending on the illumination with two different wavelengths within the UV light region. Thus, superimposing the digital images of two different UV light illuminations in combination with an illumination with visible light significantly enhances the information content of the superimposed image. For many applications, UV light illuminations with a wavelength of 270 nm or with a wavelength of 310 nm are also suitable and provide additional information that can be used for the evaluation of the thin-layer chromatography plate. It is also possible to superimpose two different illuminations within the visible light region, e.g. to superimpose digital images with illumination with either blue or red light. Furthermore, the different illuminations can also be adapted to specific characteristics of the camera or the optical imaging system that is used for capturing the different digital images of the thin-layer chromatography plate. Thus, by making use of e.g. a color CCD with high sensitivity in the red, green and blue region, two or more different illuminations can be used that result in high image intensity in the wavelength regions of the corresponding red, green or blue region of the color CCD in order to match the high sensitivity of the optical imaging system.

During the evaluation step the image information of two or more digital images is superimposed. The image information can comprise any information that can be extracted by analyzing the digital images, e.g. the position and intensity of spots of the samples that have been separated over the surface of the thin-layer chromatography plate. However, according to an advantageous aspect of the invention, the image information that is used for superimposing is equal to or proportional to a pixel value of a pixel of the digital image. The pixel value can be the intensity value or a color-coded value of said pixel from the digital image. Thus, the superimposition can be performed without any prior analysis of the digital images and without any manual support. According to another embodiment of this feature, the pixel value can be calculated on the basis of such pixel information from the digital image, which allows for adding additional information like e.g. the kind of illumination that was used for taking the digital image or weighting information that differs between different regions of the surface of the thin-layer chromatography plate. It is also possible to perform some kind of image analysis and automatic image enhancements with each single digital image before superimposing the pixel values of the respective digital images. Instead of pixel values, it is also possible to superimpose image information that is based on information from a region of the digital image, e.g. the averaged intensity of a spot region of the digital image. The resulting overlay comprises the image information of all digital images that have been taken into account for the superimposition. The evaluation and analysis of the superimposed overlay can be performed with higher precision and usually yields better results than the evaluation and analysis of each single digital image. Extracting the image information that is used for superimposing the two or more digital images as well as a subsequently performed superimposition of the corresponding image information can be performed automatically, e.g. on the basis of previously defined methods and threshold values.

The respective pixel values can be of any color-coding format or file format that is used for storing the image information of the digital images and the resulting superimposition. For most applications, the image information that is superimposed can be proportional to an intensity value that sums up all different colors, i.e. that sums up the image information over all wavelengths. However, it might be advantageous to limit the image information to a preset color range or to a single color. For example, the image information can be selected as green component of the pixel color of the digital images.

The superimposition can be performed for the full surface of the digital images or, preferably, for the full surface of the thin-layer chromatography plates that have been identified within the digital images. It is also possible to limit the superimposition to only those regions of the surface of the thin-layer chromatography plates that comprise a spot that has been identified within at least one digital image.

In yet another embodiment of the invention, the image information is proportional to a grey value of the pixels within the respective regions. It is considered favorable to take grayscale images from the thin-layer chromatography plates or to convert the digital images that have been taken with a different color-coding format into a grayscale format. There is usually no significant loss of image information, but the computing effort required for the superimposition and subsequent evaluation can be reduced.

According to an advantageous aspect of the invention, within the evaluation step a track identification step is performed, whereby for a previously determined number of stripes running from a base line to a solvent front a stripe intensity is determined as a sum of pixel intensities of pixels within the respective stripe, and whereby for each stripe with a local maximum or with a local minimum of stripe intensity a corresponding track is identified. The number of tracks can be manually preset by a user that identifies the correct number of tracks that have been developed on the thin-layer chromatography plate. It is also possible and more convenient for the user to provide for an automated determination of the number of tracks, e.g. with automated image analysis based on the pixel intensities. In order to facilitate the image analysis performed by appropriate software, the general shape and direction of the tracks can be preset. However, for most applications it is possible to automatically identify tracks on the basis of the shape and orientation of spots that are located within a single track, as most spots are of oval shape with the direction of longest extent oriented perpendicular to the direction of the track, which usually comprises several such spots. Depending on the kind of thin-layer chromatography plate and the illumination that is used for creating the digital image, the spots will be visualized as either bright regions on a darker background, or as dark regions on a bright background. Thus, the stripe intensity can either be a local maximum or local minimum when compared to the intensity of regions next to the respective stripe.

According to another favorable aspect of the invention, the evaluation of the thin-layer chromatography includes the calculation of densitometry information along a predetermined line or track along the thin-layer chromatography plate. During the development of the thin-layer chromatography plate with one or more samples, each sample will be separated along a given linear track on the surface of the thin-layer chromatography plate. A track equals a rectangular region that corresponds to the surface of the thin-layer chromatography plate that is covered by the separation of a sample material during the development. A direction of the track equals the travel direction of the mobile phase during the development of the thin-layer chromatography plate. A width of the track equals a width of at least one spot that is visible along the track and usually corresponds to a width of the sample material that has been applied at this track to the thin-layer chromatography plate. If several spots are visible along the direction of the separation of the sample material, the width of the track can be adapted to either the largest width of any spot along this track, or to a mean width value calculated by calculating a mean value for all the respective widths of all spots along this track. Thus, this information can be used to focus on image information along such a track. It is possible to identify each track for each sample by summing up all pixel values along the direction of the track, i.e. along the travel direction of the mobile phase during the development of the thin-layer chromatography plate and the separation of the sample material. The assumed minimum width of a track can be preset as a number of pixels that corresponds to the minimum width of the track. Then, the total pixel value that is the result of the sum operation along the direction of the track is calculated along a direction that is perpendicular to the direction of the tracks. If the total pixel value is above a preset track minimum level or below a preset track maximum for at least the minimum width of the track, this stripe along the direction of the track is identified as a sample track, inside which a sample has been separated along this sample track. The evaluation and analysis of the digital images or of the superimposition two or more digital images can then be focused on or limited to all sample tracks that have been identified.

According to an embodiment of the invention, the position of the thin-layer chromatography plate within the digital image is identified by automatic digital image processing. Such an identification can be performed with software modules or methods that are well-known and can easily be implemented within a software program that performs several or all steps required for the evaluation of the thin-layer chromatography plate, i.e. the digitization step, the position identification step and the evaluation step, including the superimposition of two or more digital images as well as an automated track detection. In addition to the identification of the position of a thin-layer chromatography plate, also the size and the orientation of such a plate can be determined by automatic digital image processing.

The identification of thin-layer chromatography plates within a digital image or the identification of the number of tracks, the orientation of tracks and the width of tracks can be performed by a preceding automatic digital image processing step resulting in a suggestion for the respective identification results, which can be visualized for being reviewed and either confirmed or corrected by a user. Thus, in case that the automatic identification of a thin-layer chromatography plate or the identification of one or more tracks thereon has failed, a user is able to manually support or finalize the respective identification. However, for most cases, the user will be able to confirm the results of the automated identification of thin-layer chromatography plates or tracks within a digital image.

Furthermore, according to yet another aspect of the invention, it is possible to remove artifacts from the digital images within an image cleaning step before or during performing the evaluation step. The size and shape of spots of sample material can be approximated. A region that is darker or brighter than the clean surface of the thin-layer chromatography plate can be compared to preset parameters that define a spot, and all such regions that do not match the criteria of a spot can be discarded as artifacts. It is also possible to make use of track information that has been determined before, and to discard all darker or brighter regions outside of a track, as all spots must be located within a track.

It is also possible to remove artifacts within a spot. By making use of known image noise reduction algorithms an artifact within a spot can be identified and appropriate correction can be performed, e.g. by replacing the pixel intensities that have been affected by the artifact with pixel intensities from the neighboring parts of the respective spot that are not affected by the artifact.

Many of the steps described above can be performed by making use of electronic data processing devices. For most steps suitable and appropriate software programs can be implemented on customary data processing devices. It is also possible to make use of individually adapted hardware that is configured to perform e.g. automated image analysis methods for large digital images within a short period of time.

The invention also relates to an evaluation device for thin-layer chromatography with a light-proof closable digitization chamber with a base plate for receiving a thin-layer chromatography plate, with an illumination device for illuminating the thin-layer chromatography plate on the base plate, with a digital imaging device for obtaining a digital image of the thin-layer chromatography plate that is illuminated with the illumination device, and with an evaluation unit for performing an evaluation of the digital image. The evaluation devices that are described in prior art or that are available for performing the evaluation of thin-layer chromatography plates with separated samples are usually limited to some basic evaluation steps that can be performed for a given size of thin-layer chromatography plates. In most cases, the evaluation and further analysis of thin-layer chromatography plates requires manual input and interaction with a user with significant skills and experience in the evaluation of thin-layer chromatography plates.

Thus, there is a need for an evaluation device that provides additional support for the evaluation of thin-layer chromatography plates, and that allows for automatically performing some or all steps that are required for the evaluation process.

According to an advantageous aspect of the invention, the evaluation device is adapted to perform the method described above. The evaluation device comprises two or more different illumination devices that are adapted to illuminate a thin-layer chromatography plate that is inserted into the digitization chamber with light with different wavelengths. Furthermore, the evaluation device comprises an evaluation unit that is adapted and suitable for performing the evaluation method described above, i.e. to take two or more different digital images with different illumination from a thin-layer chromatography plate that is inside of the digitization chamber, and to properly superimpose the image information of the two or more different digital images. The evaluation unit is preferably also able to perform digital image processing methods to automatically identify the size, the position and the orientation of the thin-layer chromatography plate. According to another aspect of the invention, the evaluation unit is also designed and configured to identify tracks within the surface of the thin-layer chromatography plate, and to remove artifacts that do not match preset criteria defining spots of the separated sample. With such an evaluation device, a fully automated evaluation of different thin-layer chromatography plates can be performed without the need for manual input or interaction with a user. Of course, it is possible to display or to store the results of each single step that is performed during the evaluation in order to allow for a subsequent review of the evaluation process or for a manual input or interaction in case this is deemed favorable during or after the evaluation process.

According to another aspect of the invention, the evaluation device comprises a data communication unit that enables a wireless data transmission of the data related to the evaluation process to a thin-layer chromatography data storage device or to another device that can be used during the evaluation of the thin-layer chromatography plate. Thus, all information and data that seems relevant for the evaluation of the thin-layer chromatography plate can be transmitted to a storage device for storing this information and data for future use, e.g. for reviewing or repeating the evaluation process. Furthermore, the stored information and data can be easily accessed and retrieved from any location worldwide. Thus, the results of the evaluation of the thin-layer chromatography plate can be analyzed and compared with other data at any place or time, and is not limited to the location of the evaluation device. It is also possible to perform different kind of data analysis with different devices or at different places or times, as the results of the evaluation can be easily accessed and converted into different data formats without the requirement of physical access to the thin-layer chromatography plate from which the digital images have been taken. Furthermore, the digital images and corresponding pixel information or information about spots on the thin-layer chromatography plate can be transferred together with the thin-layer chromatography plate to another device that can be used for further analysis of the thin-layer chromatography plate. By way of example, the thin-layer chromatography plate can be transferred into an automated mass spectrometer that is capable of automatically removing some sample material from within a preset spot region from the thin-layer chromatography plate. The spot region for removal and subsequent analysis of the sample material can be information that is comprised within the results of the evaluation of the thin-layer chromatography plate and was identified, selected and preset by automated methods that have been previously performed with the evaluation device on the basis of the evaluation results for this thin-layer chromatography plate.

The data transfer can be manually triggered or performed automatically. The data communication unit may comprise standardized communication interfaces like e.g. a WLAN interface, a Bluetooth interface or an NFC interface. It is also possible to make use of an individually configured data communication unit that allows for data transfer from the evaluation device to a storage device that might be near to the evaluation device, i.e. at the same location, or far away from the evaluation device, i.e. in another location or country. It is also possible to provide for a data transmission by using a first data transmission protocol for a first data transmission from the evaluation device to an additional data transmission device that acts as a router and that is located near the evaluation device, i.e. within the same room, and then to transmit the data using a second and different data transmission protocol from the additional data transmission device to the storage device that can be located anywhere and far away from the evaluation device.

BRIEF DESCRIPTION OF THE DRAWINGS

The present invention will be more fully understood, and further features will become apparent, when reference is made to the following detailed description and the accompanying drawings. The drawings are merely representative and are not intended to limit the scope of the claims. In fact, those of ordinary skill in the art may appreciate upon reading the following specification and viewing the present drawings that various modifications and variations can be made thereto without deviating from the innovative concepts of the invention. Like parts depicted in the drawings are referred to by the same reference numerals.

FIG. 1A illustrates a first digital image 1 of a thin-layer chromatography plate 2 with three different samples that have been separated along a travel direction indicated with an arrow 3. The first digital image 1 has been taken inside a light-proof digitization chamber within an evaluation device 4 that is illustrated in more detail in FIG. 6. During the acquisition of the first digital image 1 the thin-layer chromatography plate 2 was illuminated with visible light, i.e. white light with a broad emission range within a wavelength range between 400 nm and 800 nm. FIG. 1B illustrates a second digital image 5 of the same thin-layer chromatography plate 2 that was illuminated with UV light, i.e. with light with a narrow wavelength band around 366 nm. Thus, after performing a digitization step, two digital images 1, 5 are available that comprise the image of the same thin-layer chromatography plate 2 that has been taken with different illumination.

Figure 1A:
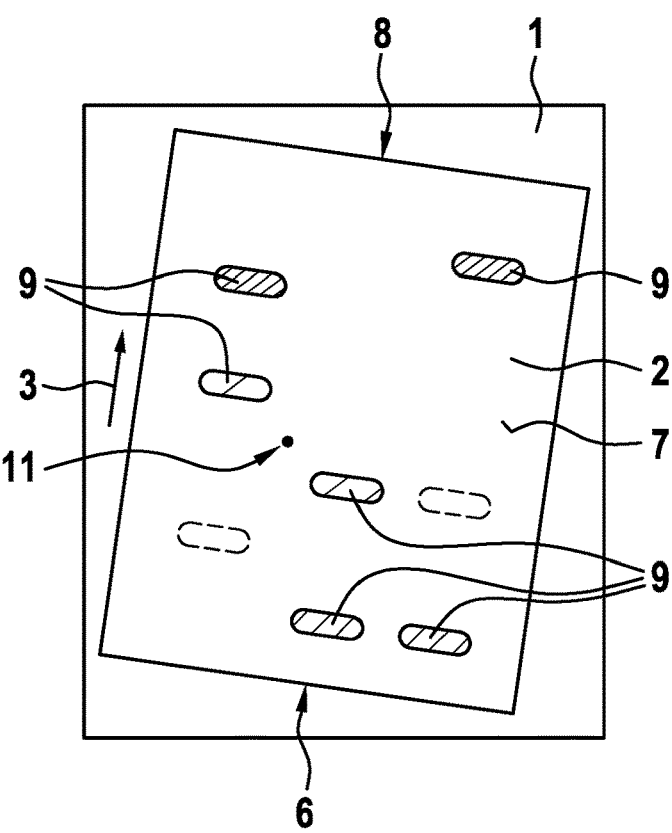
FIGS. 1A and 1B illustrate schematic views of two digital images of the same thin-layer chromatography plate, each illuminated with a different light and thus showing spots of sample material that are visible in the respective illumination.
Figure 1B:
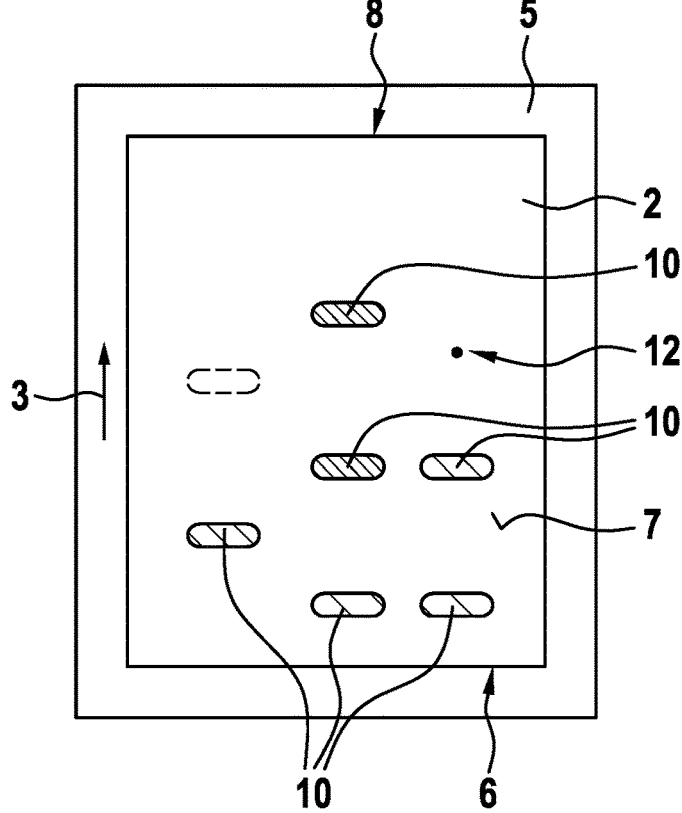

During a development of the thin-layer chromatography plate 2 that has been performed before the two digital images 1, 5 have been taken, each of the three samples have been subjected to a solvent that has travelled from an area of immersion next to a baseline that is usually parallel to a bottom border 6 of the thin-layer chromatography plate 2 along the travel direction 3 across a surface 7 of the thin-layer chromatography plate 2 towards a solvent front near the upper border 8 of the thin-layer chromatography plate 2. The components of the three samples are separated along the travel direction 3 into distinct spots 9, 10. However, due to the different illumination, some spots 9, 10 are only visible in one of the two digital images 1, 5, whereas some other spots 9, 10 are visible in both digital images 1, 5. In addition to the spots 9, 10, there are also artifacts 11, 12 within each of the digital images 1, 5, that do not represent separated sample material, but have been created by e.g. dust or other contamination of the thin-layer chromatography plate 2.

Within a position identification step, the size and position of the thin-layer chromatography plate 2 within the digital images 1, 5 is determined by digital image processing using well-known methods e.g. for determining borders of rectangular shapes of arbitrary size and orientation within the digital image 1, 5. Afterwards, for each of the digital images 1, 5, the image of the thin-layer chromatography plate 2 is referenced to coordinates on the surface 7 of the thin-layer chromatography plate 2.

Figure 2:
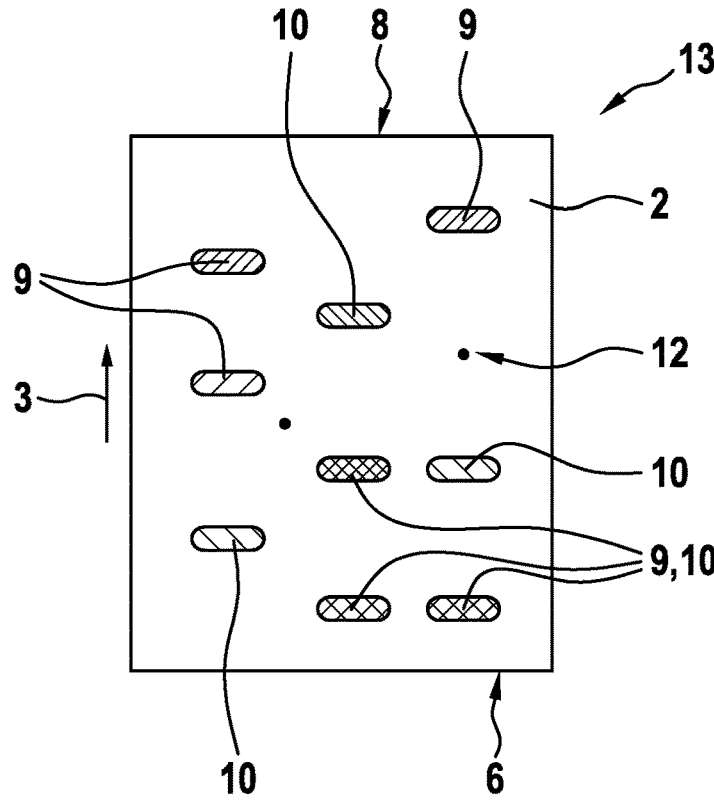
FIG. 2 illustrates a schematic view of a superimposition of the two digital images after performing digital image processing to identify the size, position and orientation of the thin-layer chromatography plate.

During a subsequently performed evaluation step, at first the two images of the thin-layer chromatography plate 2 from the two digital images 1, 5 are superimposed by overlaying corresponding pixel values. The overlay of pixel values for superimposition of the two digital images 1, 5 can be performed e.g. by adding the pixel values or by adopting the maximum pixel value from the two digital images 1, 5 or by calculating a weighted sum of the pixel values, whereby the respective weighting factors can be either preset or determined on the basis of any available digital image information. The resulting overlay or superimposition 13 is illustrated in FIG. 2. The superimposition 13 shows all spots 9, 10, that are visible during either visible light illumination or UV light illumination. Due to the previously matched size and position of the images of the thin-layer chromatography plate 2 within the two digital images 1, 5, also the position of the spots 9, 10 are matching. Thus, the superimposition 13 comprises more information about the samples as each of the respective digital images 1, 5.

Figure 3:
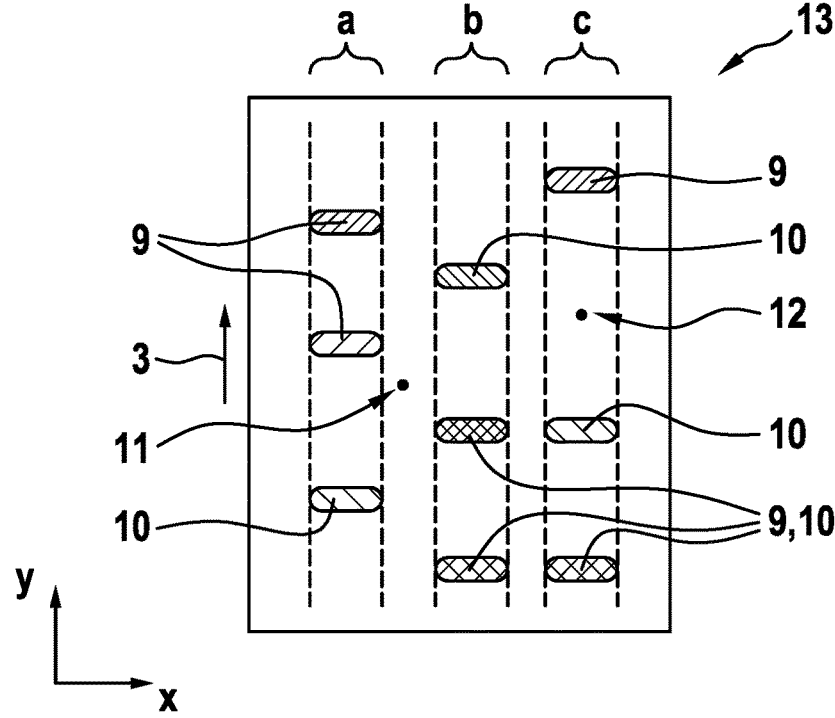
FIG. 3 illustrates an enlarged schematic view of the superimposition shown in FIG. 2, with additional representation of tracks of separated sample material.
Figure 4:
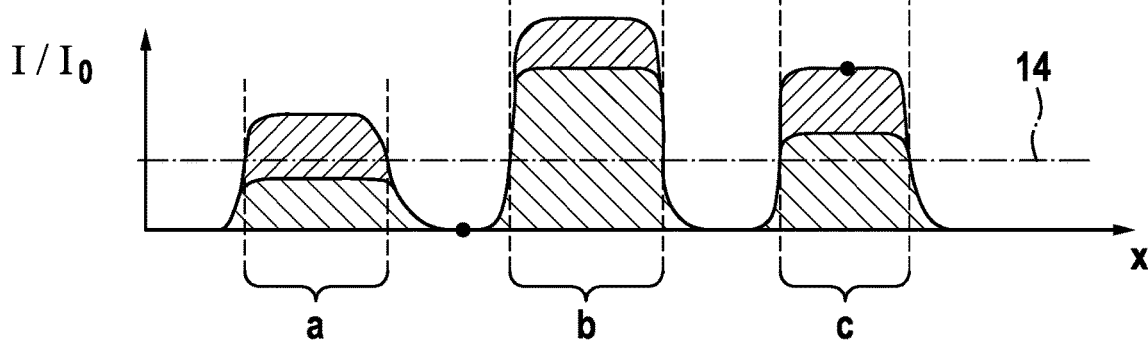
FIG. 4 illustrates a sum of pixel values along a line that is parallel to a base line of the sample material and perpendicular to the travel direction of the solvent during the development of the thin-layer chromatography plate, showing the identification of tracks.

FIG. 3 illustrates the superimposition 13 of the two images of the thin-layer chromatography plate 2 in more detail and in an enlarged view. During a track identification step, for a number of stripes running from the baseline or the bottom border 6 along the travel direction 3 up to the solvent front line or the upper border 8 a normalized stripe intensity $\frac{1}{10}$ is determined as a sum of pixel intensities of pixels within the respective stripe, and whereby for each stripe with a local maximum of stripe intensity $\frac{1}{10}$ a corresponding track is identified. The travel direction 3 of the thin-layer chromatography plate 2 is arranged along a y-axis of a coordinate system that has been referenced with the thin-layer chromatography plate 2. Each stripe runs parallel to the y-axis. For each position or pixel along a line that runs parallel to the x-axis, the summed-up stripe intensity $\frac{1}{10}$ is shown in FIG. 4. The stripe intensity $\frac{1}{10}$ can be calculated by converting the superimposition 13 into a grayscale image and by adding the gray value of each pixel along the respective stripe. In order to identify a track a, b or c, some appropriate criteria can be preset like e.g. the minimum width or number of stripes that forms a track, and a minimum stripe intensity threshold or track minimum level 14 of stripe intensity $\frac{1}{10}$ that is required for a track. Based on the calculated stripe intensity $\frac{1}{10}$, a track a, b and c can be identified as a range of pixels with a stripe intensity $\frac{1}{10}$ that meets all the criteria. The track a, b and c that have been identified in such a manner are indicated with dashed lines in FIGS. 3 and 4.

Figure 5:
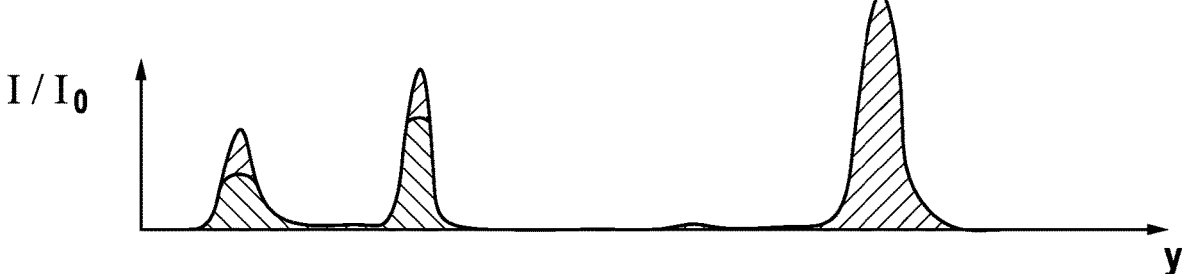
FIG. 5 illustrates a densitometry information along a single track shown in FIG. 3.

After identifying the tracks a, b, and c that correspond to respective samples that have been separated along the corresponding tracks a, b and c, a track densitometry information can be calculated along the travel direction 3, i.e. along the y-axis by summing up all pixel values within a track a, b, or c with the same value of the y-axis, i.e. across the corresponding track a, b, or c. FIG. 5 illustrates such a track densitometry information that has been calculated for the track b in FIG. 3. Such a track densitometry can be the basis for further analysis of the results of the sample separation performed with the thin-layer chromatography plate 2.

Within an image cleaning step that is performed during the evaluation step, the artifacts 11, 12 are compared with predefined criteria and with track information about the tracks a, b, and c that have been identified before. The artifact 11 is outside of any track a, b and c and thus discarded. The artifact 12 is inside track c, but does not meet the predefined criteria related to shape and size of a spot 9, 10, and is discarded for this reason.

In the FIGS. 3, 4 and 5, the different hachure of spots 9, 10, of the stripe intensity $\frac{1}{10}$ and of the track densitometry indicate the respective contribution from the two different digital images 1, 5 to the resulting superimposition 13 and the information calculated on the basis of this superimposition 13.

Figure 6:
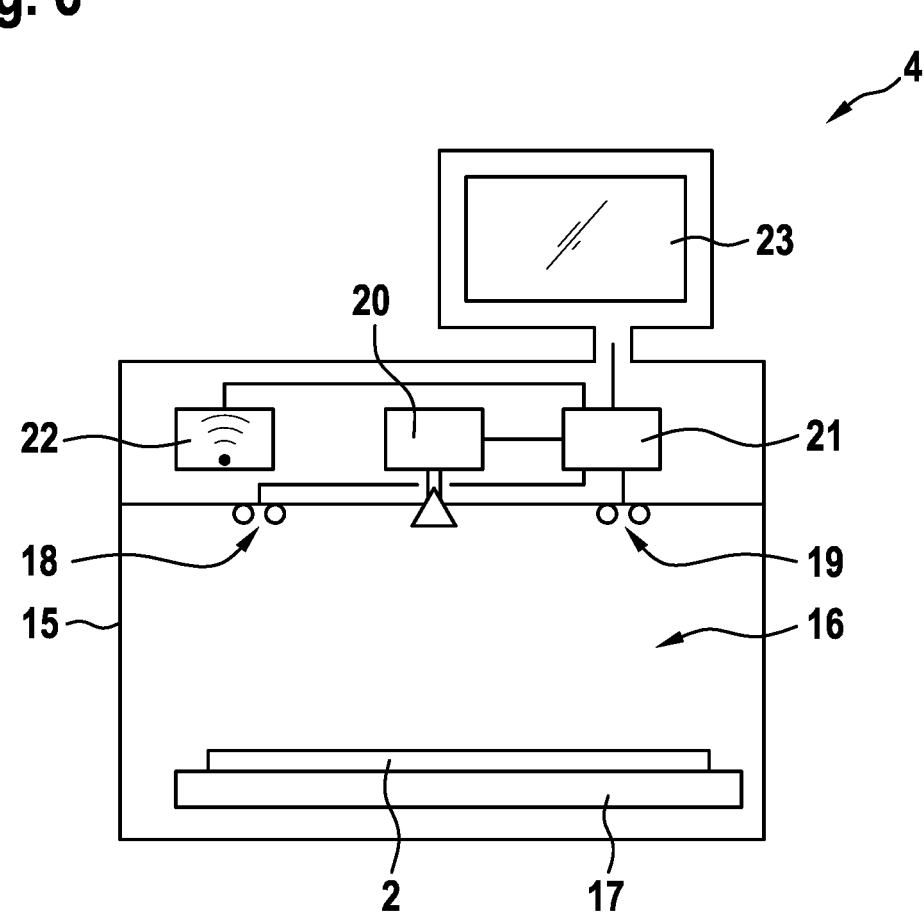
FIG. 6 illustrates a schematic section view of an evaluation device according to the invention that is designed and configured to perform the evaluation method according to the invention.

FIG. 6 illustrates an exemplary embodiment of the evaluation device 4. The evaluation device 4 comprises a housing 15 surrounding a light-proof shielded digitization chamber 16 with a base plate 17 that is mounted inside the digitization chamber 16 in a slidable manner and that can be moved linearly out of the digitization chamber 16 to receive or remove the thin-layer chromatography plate 2.

The evaluation device 14 further comprises a first illumination device 18 for illumination of the thin-layer chromatography plate 2 with visible light emitted from light emitting diodes, and a second illumination device 19 for illumination of the thin-layer chromatography plate 2 with UV light with a wavelength of 366 nm that is emitted from corresponding light emitting diodes. The first illumination device 18 and the second illumination device 19 can also be gas discharge lamps or other illumination devices that are able to emit light and to illuminate a thin-layer chromatography plate 2 that is arranged on the base plate 17. The evaluation device 14 also comprises a digital imaging device 20 for taking digital images 1, 5 from the thin-layer chromatography plate 2 that is illuminated with either the first illumination device 18 or with the second illumination device 19.

The digital images 1, 5 are processed with an evaluation unit 21 that performs the evaluation method described above. All image information and additional data can be forwarded to a data communication unit 22 and transmitted to a data storage device not shown in FIG. 6. The evaluation device 14 also comprises a display 23 for displaying relevant information to a user. The display 23 can be a touch-sensitive display that allows for some user input, e.g. some trigger information for performing some or all steps during the evaluation process.

The invention claimed is:

1. A method for evaluation of a thin-layer chromatography plate (2) after performing a separation process that separates components of a sample on the thin-layer chromatography plate (2), the method comprising:

a digitization step wherein a digital image (1, 5) of the thin-layer chromatography plate (2) is taken with a digital imaging device (20), a position identification step wherein the position of the thin-layer chromatography plate (2) within the digital image (1, 5) is identified, and an evaluation step wherein the position of visible spots (9, 10) indicating sample components on the thin-layer chromatography plate (2) is determined in order to evaluate the thin-layer chromatography on the basis of the determined positions of spots (9, 10), wherein within the digitization step at least two digital images (1, 5) that differ with respect to the wavelength range of illumination are taken, wherein within the position identification step the position of the thin-layer chromatography plate (2) is identified for each of the at least two digital images (1, 5), and wherein within the evaluation step an image information of the at least two digital images (1, 5) is superimposed for at least all regions with at least one visible spot (9, 10) within at least one of the at least two digital images (1, 5), so that the superimposition (10) of image information from identical regions of at least two digital images (1, 5) can be used for evaluation of the thin-layer chromatography plate, wherein within the evaluation step a track identification step is performed, whereby for a predetermined or automatically detected number of stripes running from a baseline to a solvent front a stripe intensity is determined as a sum of pixel intensities of pixels within the respective stripe, and whereby for each stripe with a local maximum or with a local minimum of stripe intensity a corresponding track (a, b, c) is identified.

2. The method according to claim 1, wherein at least one digital image (1) is taken with illumination of the thin-layer chromatography plate (2) with visible light and at least one digital image (5) is taken with illumination of the thin-layer chromatography plate (2) with UV light.

3. The method according to claim 2, wherein the visible light is monochrome light with a wavelength within the wavelength region between 400 nm to 750 nm, or the visible light is white light comprising wavelengths between 400 nm up to 800 nm, and the UV light comprises wavelengths below 300 nm.

4. The method according to claim 1, wherein at least three different digital images (1, 5) with illumination with different light are taken and used for evaluation.

5. The method according to claim 4, wherein one of the at least three different digital images (1, 5) is taken with illumination with white light, and two of the least three different digital images (1, 5) are taken with illumination of two different wavelengths of UV light.

6. The method according to claim 1, wherein the image information that is used for superimposing is equal to or proportional to a pixel value of a pixel of the digital image.

7. The method according to claim 6, wherein the image information is proportional to a gray value of the pixels within the respective regions.

8. The method according to claim 6, wherein the pixel value of the pixel of the digital image is an intensity value.

9. The method according to claim 6, wherein the pixel value of the pixel of the digital image is a color-coded value of said pixel from the digital image.

10. The method according to claim 1, wherein the evaluation of the thin-layer chromatography includes the calculation of densitometry information along a predetermined line or track (a, b, c) along the thin-layer chromatography plate (2).

11. The method according to claim 1, wherein the position of the thin-layer chromatography plate (2) within the digital image (1, 5) is identified by automatic digital image processing.

12. The method according to claim 11, wherein, in addition to the identification of the position of the thin-layer chromatography plate (2), the size and orientation of the thin-layer chromatography plate (2) is determined by automatic digital image processing.

13. The method according to claim 1, wherein, within an image cleaning step, artifacts are removed from the digital images (1, 5) before or during performing the evaluation step.

14. An evaluation device (14) for thin-layer chromatography comprising: a light-proof closable digitization chamber (16) with a base plate (17) for receiving a thin-layer chromatography plate (2), with an illumination device (18, 19) for illuminating the thin-layer chromatography plate (2) on the base plate (17), with a digital imaging device (20) for obtaining a digital image (1, 5) of the thin-layer chromatography plate (2) that is illuminated with the illumination device (18, 19), and with an evaluation unit (21) for performing an evaluation of the digital image (1, 5), wherein the evaluation device (14) is adapted to perform the method of claim 1.

15. The evaluation device (14) according to claim 14, wherein the evaluation device (14) further comprises a data communication unit (22) that enables a wireless data transmission of the data related to the evaluation process to a thin-layer chromatography data storage device or to another device that can be used during the evaluation of the thin-layer chromatography plate (2).

16. The evaluation device (14) according to claim 14, wherein the evaluation device comprises two or more different illumination devices that are adapted to illuminate a thin-layer chromatography plate that is inserted into the digitization chamber with light with different wavelengths.

17. The evaluation device (14) according to claim 14, further comprising an evaluation unit that is adapted and suitable for performing an evaluating two or more different digital images with different illumination from the thin-layer chromatography plate, and superimposing the image information of the two or more different digital images.

18. The evaluation device (14) according to claim 17, wherein the evaluation unit is capable of automatically identifying the size, position, and orientation of the thin-layer chromatography plate.

19. The method according to claim 1, wherein the at least two digital images (1, 5) are taken without moving the thin-layer chromatography plate and the digital imaging device with respect to each other.

\* \* \* \* \*